(No Model.) 7 Sheets—Sheet 2.
T. A. EDISON & P. KENNY.
CHEMICAL STOCK QUOTATION TELEGRAPH.

No. 314,115. Patented Mar. 17, 1885.

(No Model.) 7 Sheets—Sheet 3.
T. A. EDISON & P. KENNY.
CHEMICAL STOCK QUOTATION TELEGRAPH.

No. 314,115. Patented Mar. 17, 1885.

Fig. 5.

ATTEST: INVENTORS:

(No Model.) 7 Sheets—Sheet 5.
T. A. EDISON & P. KENNY.
CHEMICAL STOCK QUOTATION TELEGRAPH.

No. 314,115. Patented Mar. 17, 1885.

ATTEST: INVENTORS:

(No Model.)

T. A. EDISON & P. KENNY.
CHEMICAL STOCK QUOTATION TELEGRAPH.

No. 314,115. Patented Mar. 17, 1885.

Fig. 12.

ATTEST:

INVENTORS:

(No Model.) 7 Sheets—Sheet 7.

T. A. EDISON & P. KENNY.
CHEMICAL STOCK QUOTATION TELEGRAPH.

No. 314,115. Patented Mar. 17, 1885.

ATTEST:
E. T. Rowland
H. W. Riddle

INVENTORS:
Thomas A. Edison
Patrick Kenny
By Rich'd N. Dyer Atty

UNITED STATES PATENT OFFICE.

THOMAS A. EDISON, OF MENLO PARK, NEW JERSEY, AND PATRICK KENNY, OF NEW YORK, N. Y.

CHEMICAL STOCK QUOTATION TELEGRAPH.

SPECIFICATION forming part of Letters Patent No. 314,115, dated March 17, 1885.

Application filed March 19, 1884. (No model.)

*To all whom it may concern:*

Be it known that we, THOMAS A. EDISON, of Menlo Park, in the county of Middlesex and State of New Jersey, and PATRICK KENNY, of New York, in the county and State of New York, have invented a certain new and useful Improvement in Automatic Telegraphs, (Case No. 620,) of which the following is a specification.

The object we have in view is to produce a system of automatic telegraphy, and suitable instruments and connections therefor, designed to supplant the present stock-printing telegraphs, which system will operate correctly and accurately, with much greater rapidity than the stock-printing telegraphs now in use, and will have advantages of greater simplicity, durability, ease of repair, and a complete independence of the receivers. This we accomplish by utilizing for this purpose the principle of the chemical telegraph, and by such changes in construction and arrangement of instruments and connections and in manner of operation as we have found necessary and desirable to meet the different conditions of the new end sought.

In the accompanying drawings, forming a part hereof, Fig. 3, a vertical cross-section through one of the transmitting-rollers; Fig. 4ª, a top view of one of the fusible-wire safety-catches.

With reference more especially to Figs. 1 to 4, inclusive, the transmitter, by the preferred method, is operated by means of strips of paper perforated with Roman letters and Arabic numerals. These are perforated by means of an Edison perforator, such as has been used for Roman-letter telegraphs. The transmitter has two sets of transmitting devices for each line, so that the transmission can be made continuous, one set being in operation while a perforated strip is being adjusted to the other set. The transmitter is also constructed for transmitting from the same strip over two or more lines simultaneously, the transmitting devices of the two or more lines being arranged in the same trough or paper-way, and the strip being drawn under all the transmitting styluses by a single feeding device. The perforated strip is left with an imperforate end of sufficient length to extend under all the styluses to the feeding device.

Figure 1:
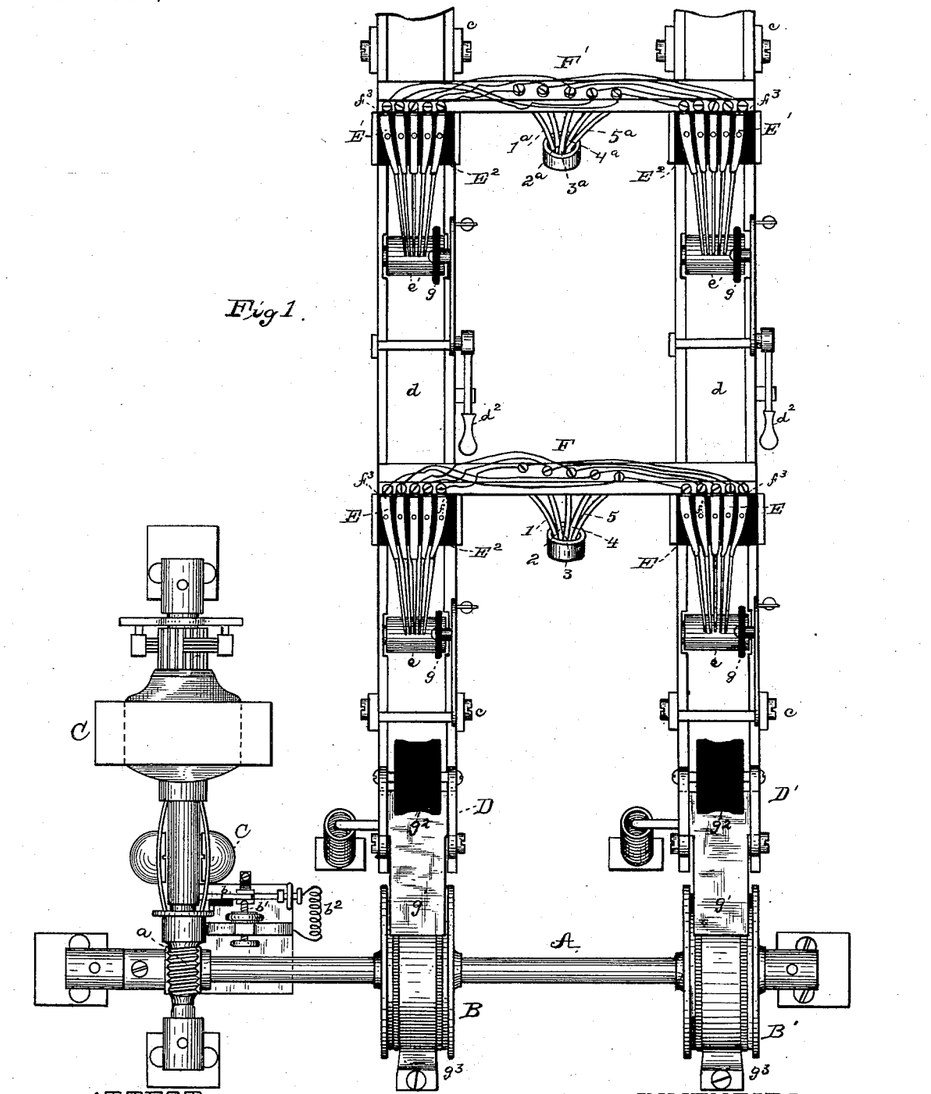
Figure 1 is a top view of the transmitter.

A is a horizontal shaft, which operates the feeding-wheels of the one or more transmitters. It is shown in Fig. 1 as working the feeding-wheels B B' of one transmitter. This shaft is rotated by any suitable power, electrical or mechanical. A continuously-wound electro-dynamic motor, C, is preferably used for the purpose, its armature-shaft having a worm, $a$, engaging with a worm-wheel on the shaft A. This motor may be operated from any source of electrical energy. It is provided with a ball-governor, C', located upon its shaft, which governor acts upon a spring-lever, $b$, tending to separate it from an adjustable contact, $b'$. The motor-circuit passes through $b$ and $b'$, and by the separation of these parts such circuit is broken. A resistance, $b^2$, may be located in a shunt around the break to reduce the spark. By means of the governor controlling the motor-circuit the speed of the motor and of the feeding-wheels rotated by it will be kept uniform. The speed at which the governor will break the circuit can be varied by adjusting the contact $b'$. It is evident that the regulation of the motor speed and its adjustment can be performed in any other known way. By this adjustment and a similar adjustment at the receivers, to be hereinafter described, the speed of the transmitter and the receivers can be given the proper relation, so that the letters and figures produced by the receivers will be of the desired size. With a definite speed at the receivers the size lengthwise of the strip of the letters produced by them will be inversely proportional to the speed of the transmitter. The size of such letters can be increased by reducing the speed at the transmitter, and reduced by increasing the transmitter's speed.

From the feeding-wheels B B' extend two horizontal troughs or paper-ways, D D', the sides of which form guides for properly directing the perforated strips of paper. The troughs are supported by forked standards $c$, and they have movable bottom plates, $d$, which rest when lowered upon such standards. Each trough-bottom is raised by a wiper, $d'$, worked by a handle, $d^2$, and is guided by pins $d^3$, working in slots in the sides of the trough.

Figures 2, 4, 4A, 5:
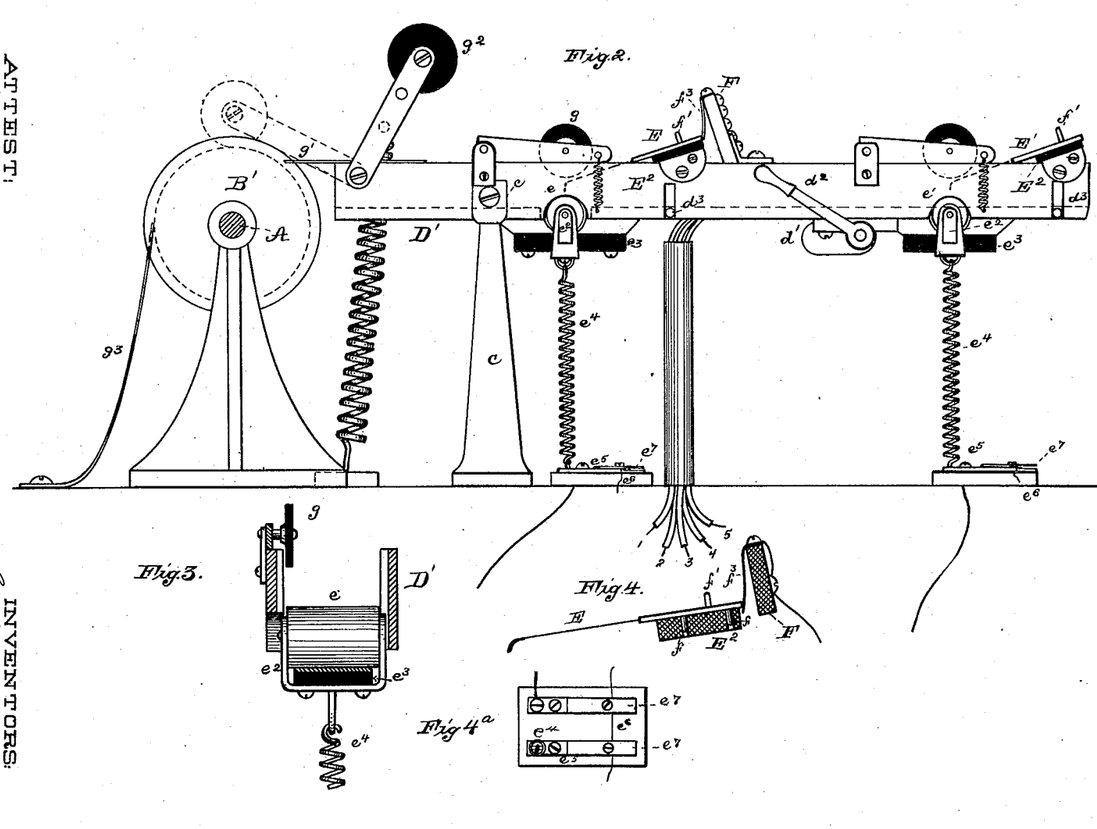
Fig. 2, a side elevation of the same.
Fig. 4, a section through the support of a transmitting-stylus, showing circuit-connection.
Fig. 5, a top view of the receiver.
Figure 5:
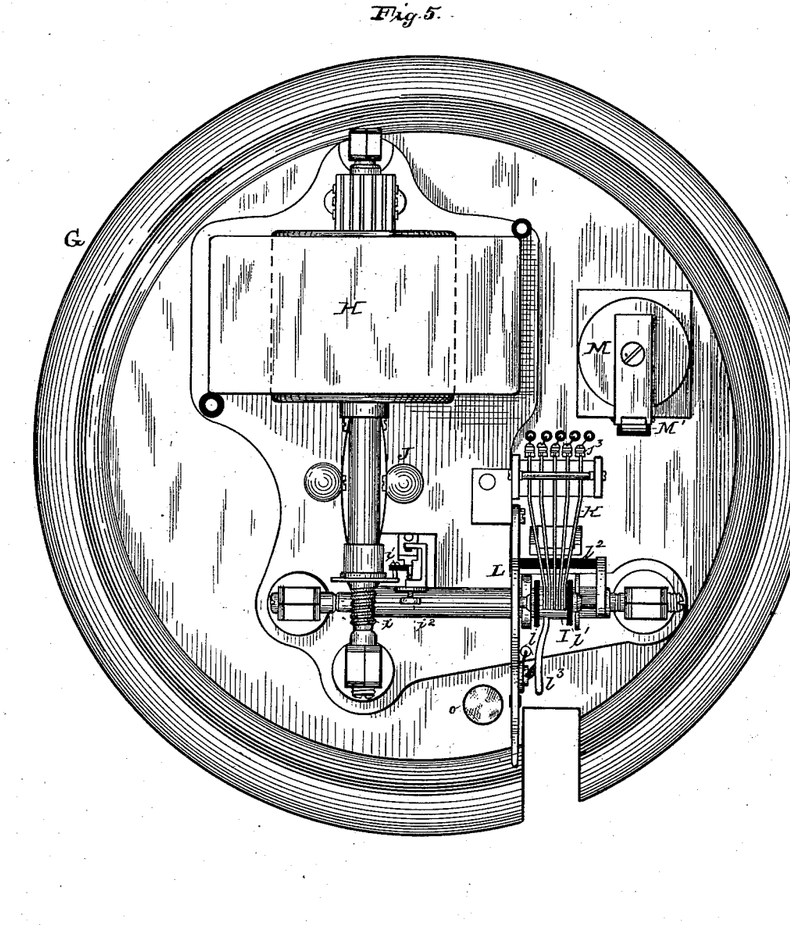

Mounted upon each bottom $d$, but insulated therefrom, are two or more transmitting-rollers, $e\ e'$. These are held by straps $e^2$, secured to insulation $e^3$, holding the rollers out of contact with other metal parts. Such straps are shown in Figs. 2 and 3. Springs $e^4$ connect the straps with circuit-terminal plates $e^5$, and serve also to draw the bottom plate downwardly. Between each plate $e^5$ and the circuit-wire is a fusible-wire safety-catch, $e^6$, held by springs $e^7$ to protect the small stylus and pen-wires, as will be explained further on.

Two or more sets of transmitting styluses, E E', are mounted in each of the troughs D D'. Each set is carried by an insulating-block, $E^2$, which is secured to the sides of the trough, and is inclined so that the styluses project down into the trough with their forward ends directly over the center of a transmitting-roller. Each stylus is a spring with a stiff shank, and has on the under side of its shank two pins, $f$, which enter holes in the block $E^2$ and serve to hold the stylus in place. A pin, $f'$, on the upper side of each stylus-shank permits the stylus to be readily removed or secured in position by means of pliers. It will thus be seen that the styluses can be readily removed for cleaning or sharpening and others put in their places without delay. The number of styluses in each set depends upon the number of lines of perforations in the strip of paper. Five of such lines of perforations have been found most desirable for the purpose, and hence five styluses to each set are shown. The set of styluses E in trough D is directly opposite the set E in trough D', and the sets E' E' are similarly situated.

Bars F F' extend across both troughs just back of the two sets of styluses. These bars carry circuit-springs $f^3$, which project downwardly and bear against the shanks of the styluses, each bar carrying the circuit-springs of two sets of styluses—the similar sets in the two troughs. These springs form removable circuit-connections for the styluses, the act of placing a stylus in position bringing it into contact with a spring. The springs on the bars are connected to the five conductors of a cable, such conductors being indicated by the numbers 1 2 3 4 5 and $1^a\ 2^a\ 3^a\ 4^a\ 5^a$. Each cable is connected with or forms a line to which is connected the pens of a number of receiving-instruments.

The transmitting-styluses of each set rest above the center of a transmitting-roller; but when the trough-bottom is depressed the roller drops clear of the stylus-points. In the elevated position of the trough-bottom the transmitting-roller forces the strip of paper up against the points of the styluses. A spring-pressing wheel, $g$, above each transmitting-roller, presses the paper down upon the roller, causing the roller to be rotated by the movement of the paper, so as to present a clear contact-surface to the stylus-points when they drop through the perforations. A spring-pressing plate, $g'$, directs the paper strip from each trough upon the feeding-wheel. A spring-roller, $g^2$, presses the strip upon each feeding-wheel above its center, causing the wheel, which has serrated portions, to draw the strip without slipping, while a stripping-plate, $g^3$, prevents the paper from sticking to the wheel and following around to the under side of the same. A strip of perforated paper with a long imperforated end is drawn under the stylus-points of one trough, while its bottom is depressed and is passed over the feeding-roller. The trough-bottom is then raised, and the pressing-roller $g^2$ thrown into the position shown in dotted lines. The feeding-wheel draws the strip of paper, and the matter denoted by the perforations is sent out upon the two or more lines connected with the transmitter. While a strip is passing through one trough one is being placed in the other trough, and the trough-bottom is raised. When the strip of the first trough is exhausted, the roller $g^2$ of the second trough is thrown down, starting that strip. In this way little or no time will be lost by intervals in transmission.

It is evident that more than two lines could be connected with each transmitter. It is also evident that the shaft A can be used to work the feeding-wheels of more than one transmitter.

While we prefer the construction of transmitter shown, it is evident that for the purpose of carrying out the more general objects of our system the transmitter may be varied in many respects.

Instead of having the styluses close circuit directly by dropping through the perforations upon a contact-surface, it is evident that this movement can be utilized to close and open the circuit at other points, as described in our application (No. 47,216) upon fac-simile telegraphs, and that with this last form of circuit-controller, instead of using perforations in the paper, depressions may be employed, as described in said application, and instead of using a non-conducting material like paper with perforations to permit the points to drop through to metal, a metal surface may be employed with the letters marked thereon in insulating-ink; or our transmitter may be based upon the well-known principle of using type, with the surface of which the stylus-points make contact.

With reference more especially to Figs. 5 to 12, inclusive, the receiver has a base, G, carrying the parts and covered, as usual in stock-printers, by a glass case. (Not shown.) This base rests on a suitable stand, G'.

Beneath the stand is a circular box, G², containing a coil, $h$, of chemically-prepared paper. The solution used to prepare the paper is preferably ferrid-cyanide of potassium, the receiving-pens having points of iron. This box has a side door for closing it tight, and an upwardly-extending throat, $h'$, through which the paper strip passes to the receiving-roller of the instrument, the strip being restrained therein by a spring, $h^2$, located upon a pivoted flap, $h^3$.

Upon the base G is mounted an electro-dynamic motor, H. This machine has a continuously-wound armature-bobbin and a Pacinotti commutator, so that it will start from any position when its circuit is closed.

The armature-shaft of the motor is provided with a worm, $i$, which engages a worm-wheel on a shaft at right angles thereto, carrying the receiving-roller I.

The motor-shaft carries a centrifugal governor, J, which acts to separate a spring-lever contact, $i'$, from an adjustable contact, $i^2$. The speed at which the governor will separate the contacts $i'$ $i^2$ depends upon the adjustment of the contact $i^2$, and the contacts being in the motor-circuit the speed of the motor, and hence of the receiving-roller I, will be made regular by the governor, and this speed can be changed by adjusting the screw $i^2$.

As has already been explained, the size of the letters and figures (lengthwise of the strip) produced by the receiver is inversely proportional to the speed of the transmitter. The reverse is true of the speed of the receiver, the size of the letters and figures being directly proportional to speed of the receiving-roller; hence the size of the letters and figures produced by the receiver may be varied by adjusting the screw $i^2$. This adjustment will be utilized to bring the receivers into proper relation with the transmitter, so as to give the letters and figures the most desirable size.

All the receivers can be given the same speed independent of the difference in electro-motive force existing upon the line at the receivers, by reason of their location at different distances from the source of electrical energy. This is done by adjusting the governor-screws of all the receivers to such an extent that the electro-motive force at the receiver farthest from the source of electrical energy will be sufficient to drive the motor of that receiver up to the governing point. This insures the action of all the receiver-governors and a uniform speed of the receiver-motors; or the adjustment can be utilized, if desired, to produce letters of different sizes at the receivers. As described in connection with the transmitter-motor, it is evident that the regulation of the speed of the receiver-motors and their adjustment can be effected in any other known way.

A resistance, $j$, is located in a shunt around the contacts $i'$ $i^2$ to reduce the spark.

Figures 7, 8, 9, 10, 11:
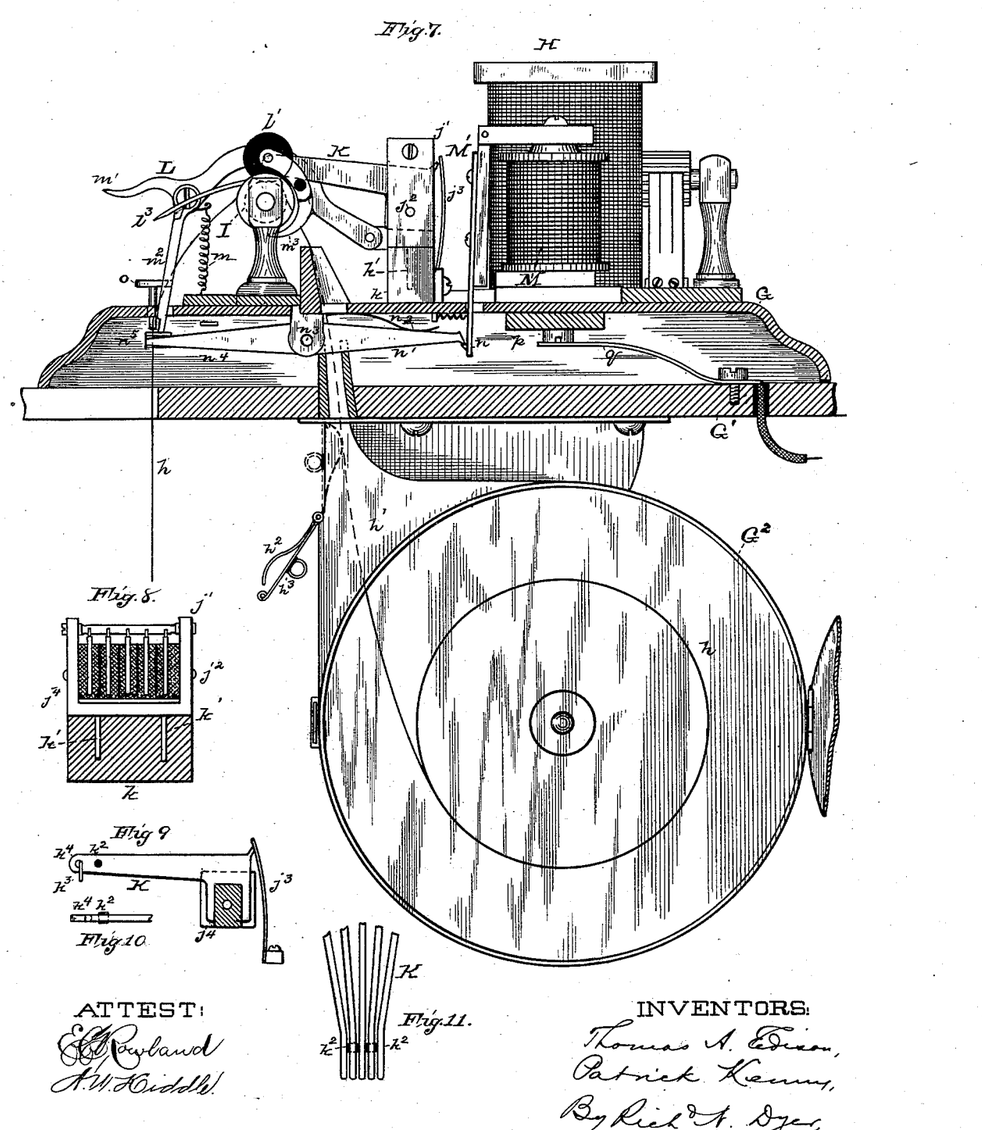
Fig. 7, a partial vertical section and elevation of the receiver.
Fig. 8, an elevation from the rear of the receiving-pens, the supporting-block being in section.
Fig. 9, a side elevation of one of the pens, its insulating pivot-block being in section.
Fig. 10, a view on a larger scale of the end of said pen from its underside.
Fig. 11, an enlarged view of the front ends of one set of receiving-pens.

K are the receiving-pens, five in number, which are plates arranged on edge and pivoted in a U-shaped frame, $j'$, by a pin, $j^2$, the pens being thrown forward upon the receiving-roller by separate springs $j^3$, which form removable circuit-connections for such pens. Each pen has a forked shank, as shown in Fig. 9, and this shank is set in a slot in the center of a block, $j^4$, of rubber or other suitable insulation. The pivot-pin $j^2$ passes through the solid portion of all five blocks, $j^4$, which are mounted thereon side by side, but are free to turn independently. The frame $j'$ is mounted upon a block, $k$, rising from the base G, the frame being held removably upon the block by pins $k'$, which enter holes in said block. The frame $j'$ can be lifted from the block $k$, and by doing so the pens can be readily removed from the instrument. This feature of removability is an important one, since it enables the pens to be taken out for cleaning and repair, which should be done frequently, while another set can be as easily placed in the instrument, so that there need be no stoppage of the instrument for repair. The simple act of placing the frame $j'$ upon the block $k$ completes the circuit-connections through the springs $j^3$, and the pens have a separate pivotal spring action, so as to conform independently to any irregularity in the thickness of the paper. The pens are brought close together at the forward ends, where, to prevent a cross-connection between the pens, the second and fourth pens are provided with small blocks $k^2$ of insulation, projecting on each side. The pens also have removable iron wearing-points $k^3$, which are inserted in slots $k^4$, one side of each slot being made concave, as shown in Fig. 10, or the parts being otherwise formed to lock the points in place. This feature of the removable pen-points is one which simplifies and cheapens repairs.

The strip of paper $h$ is pressed upon the receiving-roller, so as to be advanced thereby by two pressing-wheels, $l$ $l'$, which are carried by an arm, L, pivoted to a block rising from the base. The pressing-wheel farthest removed from arm L is carried by an insulating-pin, $l^2$, which passes under the pens K. The arm L also carries a finger, $l^3$, for guiding the paper and preventing it from curling up in front of the pen-points. The arm L is drawn downwardly by a spring, $m$, attached to base G, while it may be raised by a finger-piece, $m'$. A pivoted arm, $m^2$, Fig. 7, projects downwardly from the arm L through a slot in the base, and has a shoulder on its lower end, which catches on the edge of the slot and holds the arm L up after it is once raised. A curved finger, $m^3$, attached to arm L, projects under the shaft of the receiving-roller and strikes such shaft when the arm L is raised, preventing the arm L from being elevated to an unnecessary extent. The effect of raising the arm L is to raise the pens and also the pressing-rollers from the paper strip, releasing such strip from the drawing action of the receiving-roller. If the paper strip should break or the roll of paper give out, it is desirable that the pens should be raised from the receiving-roller to break the pen-circuits and the motor-circuit opened. This is done automatically by means of an electro-magnet, M, whose armature M' is not attracted with sufficient force to overcome its retractor, except when there is an abnormal flow of current, which will occur when the resistance of the paper is removed from the pen-circuits by the dropping of the pens directly upon the receiving-roller.

The armature M' has a latch end, $n$, extending through the base, and this engages the beveled end of a horizontal arm, $n'$, pressed downwardly by a spring, $n^2$. This arm is connected with the end of a spindle, $n^3$, the other end of which has attached to it an arm, $n^4$, carrying a plate, $n^5$, at its outer extremity, upon which rests the lower end of arm $m^3$. The movement of armature M' by magnet M releases arm $n'$, which is pressed downwardly by its spring $n^2$ and raises arm $n^4$, elevating the arm L and lifting the pens and pressing-wheels from the receiving-roller. A thumb-piece, $o$, is used to reset the parts. The arm $n^4$ in its upward movement also separates contact-points on spring-plates $o'$ $o^2$, and such contacts being in the motor-circuit said circuit is thereby broken. Instead of having special contacts for this purpose, it is evident that the movement could be utilized to separate the governor contacts $i'$ and $i^2$, opening the motor-circuit at these latter points.

Figure 6:
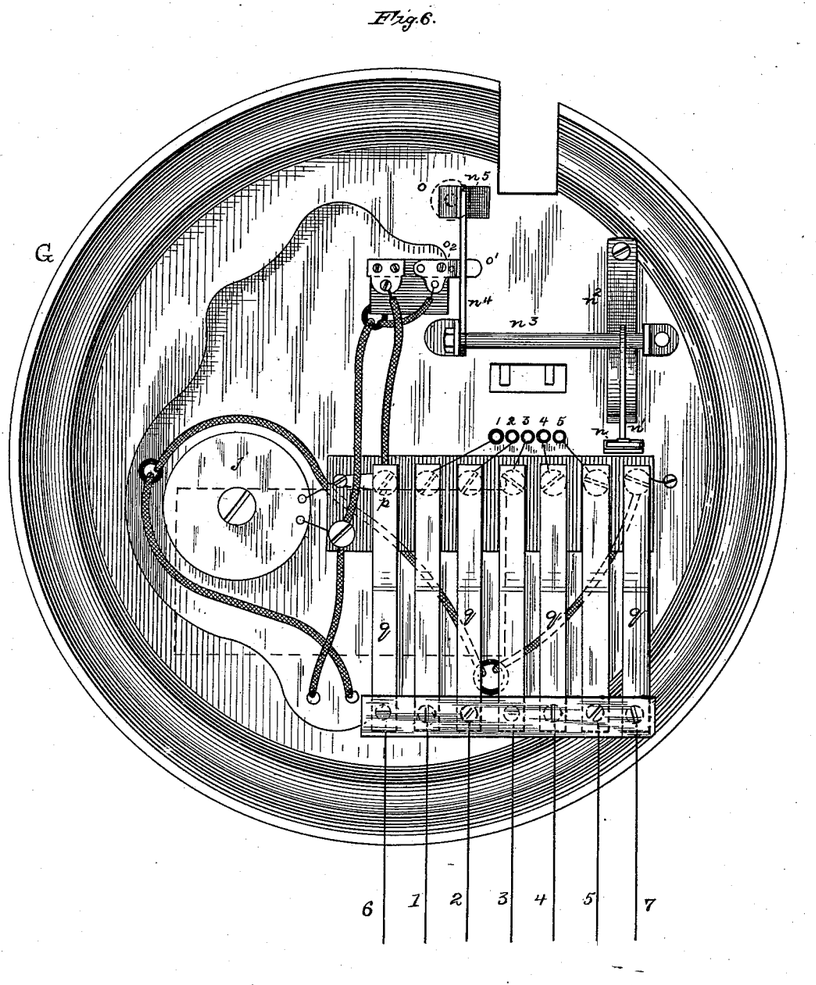
Fig. 6, a bottom view of the same and the circuit-springs.

Mounted upon a block of insulation on the under side of the base G are seven screws, $p$, Fig. 6, to which the connections of the receiver are made. Seven springs, $q$, secured upon the top of stand G', make contact with the heads of screws $p$ when the receiver is set in position upon the stand. The springs $q$ are plate-springs arranged horizontally upon the stand G'. The receiver-base is given the correct position upon the stand by suitable studs, (not shown,) so that the simple act of placing the receiver upon the stand will bring the screws $p$ into contact with the proper springs $q$ and complete the circuit-connections. This feature is one of novelty in receivers for stock-telegraphy, the series arrangement of the instruments heretofore used rendering it impracticable or undesirable. The seven screws of the cable are connected with springs $q$, the wires 1, 2, 3, 4, and 5 being the pen-wires, 6 the motor-wire, and 7 the common return for the pen and motor circuits.

Figure 12:
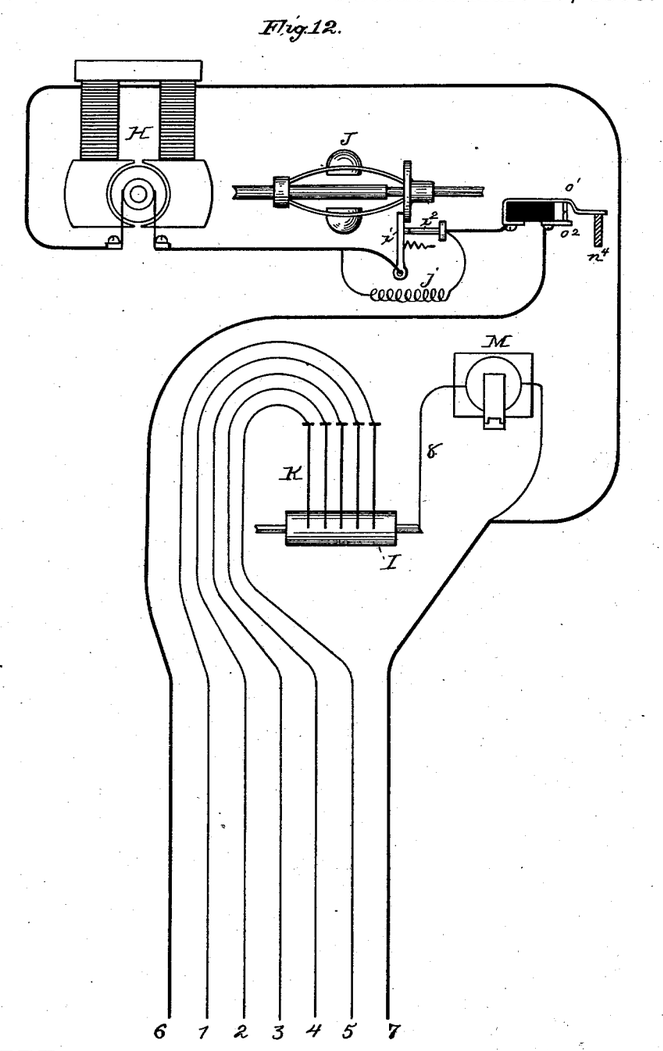
Fig. 12, a diagrammatic view showing the connections within a receiver.

The circuits within a receiver are shown more particularly in Fig. 12. The wires 1, 2, 3, 4, and 5 run directly to the pens, and from the receiving-roller a connection, 8, is made with the return-wire 7 through magnet M. Wire 6 runs to break-points $o'$ $o^2$, break-points $i'$ $i^2$, and through armature and field of motor to return-wire 7.

Figure 13:
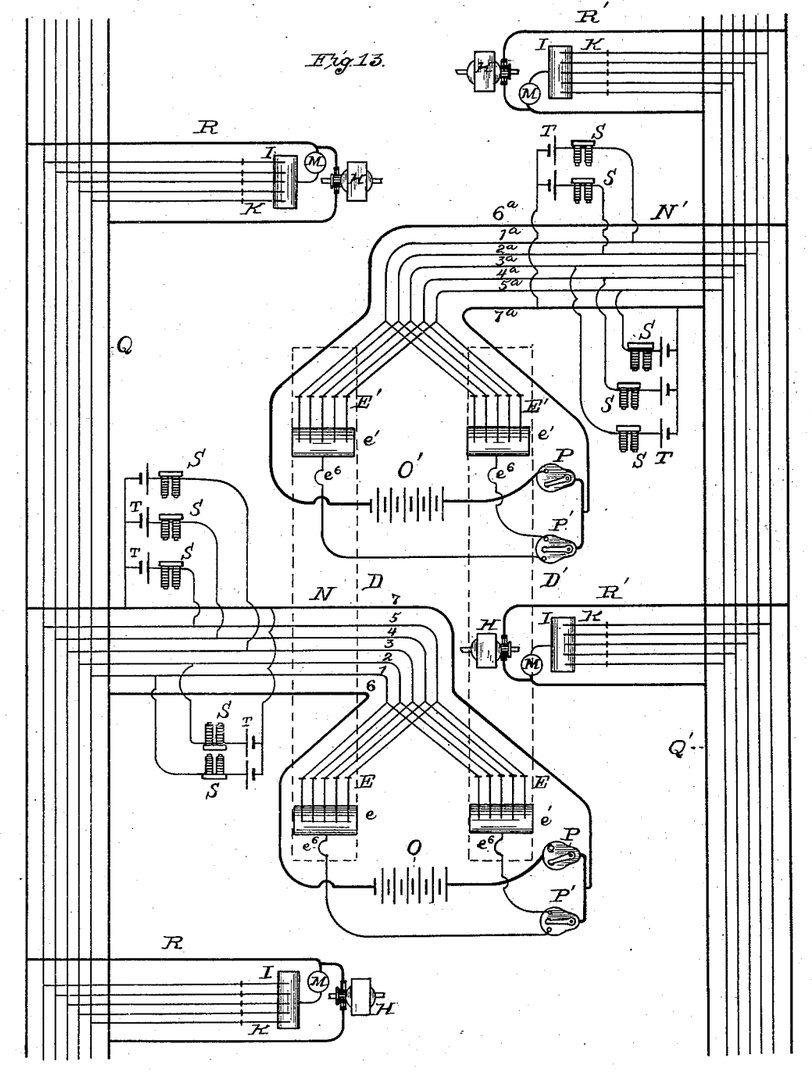
Fig. 13, a diagrammatic view showing the connections of the system between the transmitter and the receiver.

The general arrangement of the system is shown in Fig. 13, to which reference is now particularly made. The dotted lines represent the troughs or paper-ways D D' of the transmitter, in which are the transmitting-rollers $e$ $e'$ and styluses E E'. From the two opposite sets of styluses E extend five wires, 1 2 3 4 5, and with these are joined the receiver-motor wire 6 and the common return 7. These seven wires are joined into a cable, N. From the two opposite sets of styluses E' extend five wires, $1^a$ $2^a$ $3^a$ $4^a$ $5^a$, with which are joined motor-wire $6^a$ and return $7^a$, all forming a cable, N'.

It is evident that the common-return wire 7 or $7^a$ may be substituted by ground-connections.

The cables N and N' are supplied by two separate batteries, O O'. At one end each battery is connected to the motor-wire of the cable, while at its other end it is connected with the contact-point of a switch, P. A double-point switch, P', has its two contacts connected with the two transmitting-rollers of the cable, (through springs $e^4$, plates $e^5$, and safety-catches $e^6$,) while the switch-levers of the two switches are connected together and with the return-wire. The motors of the receivers connected with either cable can be set in motion by closing switch P, after which the circuits to transmitting-rollers of either trough can be closed by closing switch P' on one point or the other.

The cables N and N' may form the main line to which the receivers are connected; but since the arrangement is a multiple-arc one it is preferred that such cables should be used as feeders and extend to the centers of main lines Q Q', from which the receiver-circuits R R' will be taken. By the use of feeders the difference in the drop of electro-motive force at the receivers of each line will be much less, and the receivers can be readily made to run uniformly by adjustment of the governor-points, as before explained. The feeders for the purpose of saving in expense of conductors are preferably of higher resistance than the mains from the point of connection of the feeders therewith to the ends, and hence the main drop in electro-motive force will be upon the feeders; but since this drop does not effect the relative drop at the receivers (there being no receiving-instruments connected with such feeders) the drop upon the feeders can be made as great as desired, while that upon the main lines must be within the practical limits of adjustment of all the motors to a uniform speed.

Each receiver is located at the end of a cable, R or R', in its own multiple-arc circuit, and hence is independent of all the other receivers, and can be provided with circuit-opening devices, which in their operation will not affect any of the other receivers. This arrangement of the receivers in multiple arc is a novel feature in stock-telegraphy and one that is especially adapted for chemical-receivers. In addition to other advantages, it reduces the number of wires which it is necessary to carry into a building, since if the instruments were in a series it would be necessary to carry at least twelve wires into a building. The multiple-arc arrangement also permits of the ready attachment of additional receivers within the capacity of the line-wires.

As indicated in the diagrammatic views, Figs. 12 and 13, the motor-wire and the return-wire are of larger size than the pen-wires, for the reason that a small current only is sufficient for recording purposes, while a larger current is used in running the motors. The motor and return wires are intended to be made large enough to carry the entire current of the battery without heating injuriously; but for economy in cost and size of cable the pen-wires are so much smaller that if a short circuit should occur with one of them the pen-wire might be heated injuriously or fused. Hence a fusible-wire safety-catch properly proportioned to protect the pen-wires is located in the single wire between the battery and each transmitting-roller. This is shown in Figs. 2 and 4ª, and has been already described.

To prevent tailings and make the marks produced by the receiver clear and sharp, we arrange electro-magnets S in separate cross-circuits between the five pen-wires and the common return of each cable, as shown in Fig. 13. These multiple-arc circuits are connected with the wires of the cable at the transmitting-office and between the transmitter and the receivers. The effect of the magnets is to discharge when the pen-circuits are broken, sending reverse currents of high tension through such circuits. These currents tend, with the solution of ferrid-cyanide of potassium, to produce a white mark instead of a blue one upon the paper, and hence the blue marks are made clear and sharp.

We have found that when no current is flowing through the pen-circuits there is an action set up between the iron pen-points and the solution of the paper strip, and it seems also that by reason of the nearness together of the pen-points in the receivers the current tends to pass from the points of active pens along the surface of the paper to the points of inactive pens, causing all the pens to mark. To overcome these difficulties we place in the same cross-circuits in which the magnets are located batteries T, which are constantly in connection with the pen-circuits, and are arranged to send currents through such circuits in the reverse direction to the currents of the main battery. These batteries T are weaker than the main battery, and hence do not interfere with the transmission of the characters. The current from T, however, flows over the pen-wires when not active, and tends to make a white mark on the paper, so that the tendency to mark blue, which exists when no current is flowing, will be overcome. The tendency of the main current to pass to inactive pen-points is also counteracted.

It will be noticed that the chemical-receivers are under control from the transmitting-office, and are worked by current received therefrom, the receiver-motors upon any line being operated by the line-battery and being stopped and started by means of the switch P.

Since the pen and motor circuits are independent circuits, it is evident that a separate battery or other source of electrical energy located at the transmitting-office could be used to work the motor-circuit; but we prefer the arrangement shown.

What we claim as our invention is—

1. In automatic telegraphs, the combination, with a suitable transmitter and a chemical-receiver, of an electric motor operating the receiver and worked directly and entirely by current from the transmitting-office, substantially as set forth.

2. In automatic telegraphs, the combination, with a suitable transmitter and a chemical-receiver, of an electric motor operating the receiver, worked directly and entirely by current from the transmitting-office, and a switch at the transmitting-office for controlling the circuit of the motor, substantially as set forth.

3. In automatic telegraphs, the combination, with a suitable transmitter, of a chemical-receiver, an electric motor operating the receiver, separate pen and motor circuits from the transmitter to the receiver, a common return for all the circuits, and switches at the transmitting-office for controlling the pen and motor circuits, substantially as set forth.

4. In automatic telegraphs, the combination, with a suitable transmitter, of a line extending therefrom and two or more automatic receivers connected in multiple arc with the line, and operated directly and entirely by the line-current, substantially as set forth.

5. In automatic telegraphs, the combination, with a suitable transmitter, of a line extending therefrom, and two or more chemical-receivers connected in multiple arc with the line, and operated directly and entirely by the line-current, substantially as set forth.

6. In automatic telegraphs, the combination, with a suitable transmitter, of a line extending therefrom and including pen-wires and a separate motor-wire, and two or more chemical-receivers operated by separate electric motors, such receivers being connected in mutiple arc with the line, substantially as set forth.

7. In automatic telegraphs, the combination, with a transmitter, a line, and two or more receivers connected in multiple arc with said line, of a feeder extending from the transmitter to the center of the line, substantially as set forth.

8. In automatic telegraphs, the combination, with a suitable transmitter, a line including pen-wires and a separate motor-wire, chemical-receivers operated by separate electric motors and connected in multiple arc with the line, and a feeder extending from the transmitter to the center of the line, substantially as set forth.

9. In automatic telegraphs, the combination, with a transmitter, a line therefrom to receivers, including small pen-wires and a larger motor-wire capable of carrying without injury the entire battery-current, of a safety-catch for protecting the small pen-wires, substantially as set forth.

10. In automatic telegraphs, the combination, with a transmitter having several independent transmitting-styluses, from which run separate pen-wires, and a battery connected by a single conductor with the transmitting-roller, of a safety-catch for protecting the pen-wires located in the conductor common to all the styluses, substantially as set forth.

11. In automatic chemical telegraphs, the combination, with a number of independent line pen-wires and instruments for transmitting and receiving Roman letters, of magnets located in cross-circuits between such pen-wires, and a common return for preventing tailings, substantially as set forth.

12. In automatic chemical telegraphs, the combination, with a number of independent line pen-wires and instruments for transmitting and receiving Roman letters, of a number of batteries for sending currents upon the separate pen-wires reverse in direction to the main battery-current, such batteries being located in cross circuits between the pen-wires and a common return, and serving to prevent the marking of inactive pens, substantially as set forth.

13. In automatic chemical telegraphs, the combination, with a number of independent line pen-wires and instruments for transmitting and receiving Roman letters, of electro-magnets and reverse-current batteries located in cross-circuits between the several pen-wires and a common return, substantially as set forth.

14. In automatic telegraphs, the combination, with a suitable transmitter, of a chemical-receiver operated by an electric motor receiving current from the transmitting-office, and a governor for automatically governing the speed of said receiver motor, to maintain a uniform size of the characters, substantially as set forth.

15. In automatic telegraphs, the combination, with a suitable transmitter, of a chemical-receiver operated by an electric motor receiving current from the transmitting-office, and an adjustable governor for automatically governing the speed of the motor, substantially as set forth.

16. In automatic telegraphs, the combination, with a suitable transmitter operated by an electric motor, of a chemical-receiver operated by an electric motor receiving current from the transmitting-office, and adjustable governors for adjusting and controlling the relative speeds of said transmitter and receiver motors, whereby the desired size of characters will be produced by the receiver, substantially as set forth.

17. In automatic telegraphs, a chemical-receiver operated by an electric motor, in combination with a circuit-controller for automatically opening the motor-circuit when there is an abnormal flow of current, substantially as set forth.

18. In automatic telegraphs, the combination, with a chemical-receiver, of an electro-magnet located in the pen-circuit, and a circuit-controller operated or controlled by such electro-magnet for opening the pen-circuit when there is an abnormal flow of current therethrough, substantially as set forth.

19. In automatic telegraphs, the combination, with a chemical-receiver, of a lifter for automatically raising the pens from the receiving roller when there is an abnormal flow of current through the pen-circuit, substantially as set forth.

20. In automatic telegraphs, the combination, with a chemical-receiver operated by an electric motor, of an electro-magnet in the pen-circuit and a lifter operated or controlled by such electro-magnet and acting, when there is an abnormal flow of current in the pen-circuit, to raise the pens from the receiving roller and to open the motor-circuit, substantially as set forth.

21. In automatic telegraphs, the combination, with a chemical-receiver operated by an electric motor, of an electro magnet located in the pen-circuit and moving its armature only when there is an abnormal flow of current, a spring-lever released by the movement of the armature, connections with such spring-lever for raising the pens from the receiving-roller and opening the motor-circuit, and a thumb-piece for resetting the parts, substantially as set forth.

22. In chemical-receivers for automatic telegraphs, the combination, with the pivoted pens, of an arm carrying the pressing-roller, having a finger passing under the pens for raising the pens and pressing-rollers simultaneously, substantially as set forth.

23. In chemical-receivers for automatic telegraphs, the combination of a number of pens insulated from each other and mounted together in a frame removable from a suitable support, whereby the pens can be removed bodily from the instrument, substantially as set forth.

24. In chemical-receivers for automatic telegraphs, the combination of a number of pens insulated from each other and mounted in a frame held upon a support by engaging parts, whereby the pens can be removed bodily by simply raising the frame from the support, substantially as set forth.

25. In chemical-receivers for automatic telegraphs, the combination of a number of pens held removably upon a suitable support, and separate springs pressing against the shanks of said pens, but not secured thereto, for maintaining circuit-connections with such pens and permitting of their ready removal and replacement, substantially as set forth.

26. In chemical-receivers for automatic telegraphs, the combination of a number of receiving-pens mounted at their shanks upon separating insulation, said pens being brought close together at their ends and carrying insulating-studs to insure their electrical separation, substantially as set forth.

27. In chemical-receivers for automatic telegraphs, the receiving-pens having removable points, held by friction in dovetail grooves, substantially as set forth.

28. In automatic telegraphy, the combination, with a suitable support, to which the line-wires run, carrying terminals of such line-wires, of an automatic receiver having circuit-terminals engaging with the terminals of the support and completing the circuits by the act of setting the receiver upon the support, substantially as set forth.

29. In automatic telegraphy, the combination of a number of automatic receivers arranged in multiple arc, each carrying circuit-terminals, with supports for such receivers, to which the line-wires run, carrying terminals of such line-wires engaging the terminals of the receivers, and completing the circuits by the act of setting the receivers in position upon the supports, substantially as set forth.

30. In transmitters for automatic telegraphs, the combination of two troughs or paper-ways, each containing two or more sets of transmitting-styluses connected to different lines, the opposite styluses of the two troughs being connected to the same line, substantially as set forth.

31. In transmitters for automatic telegraphs, the combination, with feeding devices, of a loose transmitting-roller separate from the feeding devices, transmitting-styluses resting on the roller, and a spring-pressing wheel for pressing the traveling strip on the roller to turn said roller, substantially as set forth.

32. In transmitters for automatic telegraphs, the combination, with a feeding-wheel, of a trough or paper-way having a movable bottom, carrying one or more transmitting-rollers, and a lifter for raising said trough-bottom to bring the transmitting-rollers into contact with the transmitting-styluses, substantially as set forth.

33. In transmitters for automatic telegraphs, the independent transmitting-styluses removably held upon a support by frictionally-engaging parts, whereby they can be lifted from position, substantially as set forth.

34. In transmitters for automatic telegraphs, the combination, with the removable styluses, of springs pressing upon the shanks of said styluses, but not secured thereto, said springs permitting of the removal and replacement of the styluses, and maintaining circuit-connection therewith when in position, substantially as set forth.

35. In transmitters for automatic telegraphs, the combination, with two or more feeding-wheels and two or more troughs or paper-ways, of independent spring-rollers for pressing the strips of the troughs separately upon the feeding-wheels, substantially as set forth.

This specification signed and witnessed this 9th day of February, 1884.

THOS. A. EDISON.
PATRICK KENNY.

Witnesses:
A. W. KIDDLE,
E. C. ROWLAND.